(12) United States Patent
Blair et al.

(10) Patent No.: US 10,460,140 B2
(45) Date of Patent: Oct. 29, 2019

(54) READING AND WRITING CODES USING OPTICAL DEVICES

(71) Applicant: ILLUMINA, INC., San Diego, CA (US)

(72) Inventors: Dustin Blair, Escondido, CA (US); Nitin Udpa, San Diego, CA (US); Linh Tran, San Diego, CA (US); Nicholas Scheidler, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 15/557,811

(22) PCT Filed: Mar. 11, 2016

(86) PCT No.: PCT/US2016/022120
§ 371 (c)(1),
(2) Date: Sep. 13, 2017

(87) PCT Pub. No.: WO2016/149122
PCT Pub. Date: Sep. 22, 2016

(65) Prior Publication Data
US 2018/0341798 A1 Nov. 29, 2018

Related U.S. Application Data

(60) Provisional application No. 62/132,710, filed on Mar. 13, 2015.

(51) Int. Cl.
*G06K 7/14* (2006.01)
*G06K 19/06* (2006.01)

(52) U.S. Cl.
CPC ......... *G06K 7/1417* (2013.01); *G06K 7/1413* (2013.01); *G06K 19/06159* (2013.01)

(58) Field of Classification Search
CPC .............. G06K 7/1417; G06K 7/1413; G06K 19/06159; G06K 2017/0045; G06K 2017/009
USPC ...................... 235/462.1, 494, 454
See application file for complete search history.

(56) References Cited

U.S. PATENT DOCUMENTS

| | | | |
|---|---|---|---|
| 2002/0187501 A1 | 12/2002 | Huang | |
| 2004/0029258 A1* | 2/2004 | Heaney | B01L 3/5025 435/287.2 |
| 2006/0275852 A1* | 12/2006 | Montagu | B01L 3/502715 435/7.93 |

(Continued)

FOREIGN PATENT DOCUMENTS

| | | |
|---|---|---|
| WO | 2002/033419 A1 | 4/2002 |
| WO | 2011/073442 A1 | 6/2011 |
| WO | 2012/096703 A1 | 7/2012 |

OTHER PUBLICATIONS

Written Opinion of the International Searching Authority, PCT Application No. PCT/US2016/022120, dated Dec. 8, 2016, 6 pages.

*Primary Examiner* — Paultep Savusdiphol
(74) *Attorney, Agent, or Firm* — Illumina, Inc.

(57) ABSTRACT

A method for tracking an item that includes the steps of (a) providing an item having a solid polymer material; (b) irradiating the item to create a spatial pattern of optical modifications in the polymer material, wherein the spatial pattern of optical modifications includes a code that indicates information; and (c) detecting the pattern of optical modifications, thereby determining the information.

23 Claims, 1 Drawing Sheet

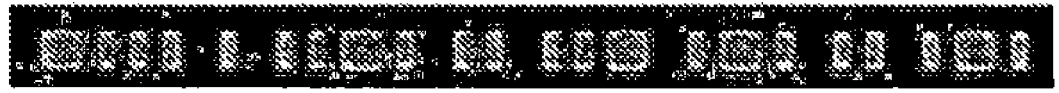

(56) References Cited

U.S. PATENT DOCUMENTS

2012/0270305 A1* 10/2012 Reed ............... B01L 3/502715
                                                    435/287.2
2015/0151297 A1*  6/2015 Williamson ...... B01L 3/502715
                                                    422/554

* cited by examiner

READING AND WRITING CODES USING OPTICAL DEVICES

BACKGROUND

This disclosure relates generally to modifications of materials that can carry codes, and more specifically to codes that can be written and read using optical devices.

Modern laboratories rely on laboratory information management systems (LIMS) for efficient and robust operation. The functions and features of LIMS can vary from lab to lab depending upon the type of work done by the lab. For example, a diagnostic lab that handles human samples will have regulatory requirements that are stricter than those for a research lab that handles non-human sample, and accordingly the LIMS for the diagnostic lab will have compliance features built in that are not necessary for the research lab. However, generally speaking LIMS provides workflow protocols, sample tracking, data tracking and in some cases management of personnel and enterprise resource planning.

The expense of LIMS increases with the complexity of the hardware used for tracking. For example, many labs will use identifiers, such as barcodes or radio frequency identification (RFID), to track samples. The identifiers can be costly as can be the devices used to detect the identifiers. Furthermore, since the identifiers are generally an extrinsic object, difficulties and costs can arise from affixing the identifiers to samples in a way that is robust (i.e. permanent through the course of the workflow), convenient to detect (i.e. on a face of a sample vessel that is easily accessible to a laboratory technician) and innocuous to the sample. For example, a barcode sticker or RFID device that comes off of a sample during handling or that blocks detection of the sample itself can be disruptive to laboratory operation and can lead to incorrect results or diagnosis.

Thus, there exists a need for cost effective identifiers that are compatible with vessels used to move samples through a laboratory workflow. The present disclosure addresses this need and provides other advantages as well.

BRIEF SUMMARY

The present disclosure provides a method for tracking an item. The method can include the steps of (a) providing an item having a solid polymer material; (b) irradiating the item to create a spatial pattern of optical modifications in the polymer material, wherein the spatial pattern of optical modifications includes a code that indicates information; and (c) detecting the pattern of optical modifications, thereby determining the information.

The present disclosure further provides a flow cell that includes (a) a transparent top window; (b) a transparent bottom window; (c) at least one channel between the transparent top window and the transparent bottom window; and (d) a spacer material between the transparent top window and the transparent bottom window, wherein a surface of the spacer material that faces the top window or the bottom window comprises a solid polymer material, wherein the solid polymer material comprises a spatial pattern of luminescent features that form a code carrying information indicating at least one manipulation carried out on the flow cell.

Also provided is an apparatus that includes (i) a flow cell including (a) a transparent top window; (b) a transparent bottom window; (c) at least one channel between the transparent top window and the transparent bottom window; and (d) a spacer material between the transparent top window and the transparent bottom window, wherein a surface of the spacer material that faces the top window or the bottom window comprises a solid polymer material, wherein the solid polymer material comprises a spatial pattern of luminescent features that form a code carrying information indicating at least one manipulation carried out on the flow cell; (ii) a laser excitation source having a power output that is sufficient to modify the spatial pattern of luminescent features in the polymer material to change the code; (iii) a detector configured to resolve the spatial pattern of luminescent features; and (iv) a computer processing unit programmed to recognize the code and to identify at least one characteristic of the at least one manipulation based on the code.

BRIEF DESCRIPTION OF THE DRAWINGS

FIG. 1 shows a luminescent barcode written in a polyimide spacer of a HiSegX™ flow cell and read using a HiSegX™ sequencer.

DETAILED DESCRIPTION

The present disclosure provides an identification system for items such as sample vessels that in many embodiments exploits a natural property of materials used for those sample vessels. Furthermore, the codes used in the identification system can be written and read using equipment that is readily available in many laboratories and clinics. In a particular example, an identification system of the present disclosure uses hardware already present in the Illumina Hiseq® family of sequencers, or other optical scanners, to write codes into polyimide material found in an Illumina flow cell or other sample vessel. More specifically, the laser found in an Illumina sequencer can be used to write a barcode or other features into the polyimide spacer that separates the top and bottom windows of a flow cell. The same laser can be used in combination with the detector of the sequencer to read the code. Although nucleic acid sequencers and flow cells with polyimide spacers will be used as examples throughout the present disclosure, it will be understood that the invention can be extended to other methods, compositions and apparatus having similar properties.

In accordance with the methods set forth herein, a code can be written into a polymer material, for example, using a laser, to create features that are visible using a luminescence detector, yet substantially invisible to the human eye or to many detection devices used in a typical laboratory or clinic. Thus, the codes can be discreet in contexts where their detection is not desired.

An advantage of the methods as they pertain to nucleic acid sequencing protocols, is that a laser that is already present in a nucleic acid sequencer can be used to write a code into a flow cell before, during or after a sequencing run. The code on the flow cell can be read in subsequent cycles carried out in the same sequencer or in other sequencers that encounter this flow cell. Thus, the ability of the sequencer to write and read the codes provides not only tracking of the flow cell through a sequencing run, but because the flow cell itself is marked during use in a first sequencer, the flow cell can be tracked when it is placed in a second sequencer. The code can be written by the first sequencer and read by the second sequencer in a way that the code functions like a key fitted to a lock in the sequencer. For example, the lock and key system can enforce single use of a flow cell by having the first sequencer write a code that indicates that the flow cell has been used and the second sequencer, upon reading the code, can reject the flow cell or refuse to process it. This lock and key system can prevent a flow cell that has already been used for a first sample from being used with a second sample, thereby preventing anomalous or poor quality results for the second sample due to contamination from the first sample. Similarly, the lock and key system can prevent a user from processing a consumed flow cell that has been mistakenly placed in a sequencer (perhaps when the user intended to insert a newly prepared flow cell). Encoding systems provided herein can also be useful in documenting error codes for troubleshooting purposes, documenting states of manufacturing quality, and facilitating workflow enhancements that relate to interactions between instruments, flow cells or other sample vessels. Although the examples above refer to a 'first' and 'second' sequencer, it will be understood that the same lock and key system can apply to a single sequencer, for example, when a flow cell is removed from the sequencer after a first use and then placed again into the same sequencer (i.e. taking on the role of the 'second' sequencer above).

Particular embodiments of the writing process set forth herein provide advantages over traditional mechanical laser marking processes. First, luminescence of the code is more easily imaged using a typical optical excitation and emission imaging system compared to detection of etched or engraved marks produced by other laser processes. For example, in some embodiments polymer material is heat modified by low power lasers to create a spatial pattern of optical modifications rather than removing or etching the polymer material as occurs when using other laser-based processes. Second, luminescent codes can be written using relatively low power lasers such as those present in a nucleic acid sequencing system. Third, codes of the present disclosure can be miniaturized to a greater degree than possible using other laser-based processes. Particular embodiments of the present methods can work by surface chemistry modifications of a material to create a code rather than imprinting the code into or through the bulk material. In contrast, mechanical laser writing (engraving) techniques typically remove significant amounts of material to yield codes which causes degradation of structural properties and limits the miniaturization achievable.

Terms used herein will be understood to take on their ordinary meaning unless specified otherwise. Examples of several terms used herein and their definitions are set forth below.

As used herein, the term "channel" means a fluid permeable passage in or on a fluid impermeable material. A channel can have a cross section that is partially or fully surrounded by a fluid impermeable material. For example, a partially surrounded cross section can be a groove, trough, furrow or gutter that inhibits lateral flow of a fluid. The transverse cross section of an open channel can be, for example, U-shaped, V-shaped, curved, angular, polygonal, or hyperbolic. A channel can have a fully surrounded cross section such as a tunnel, tube or pipe. A fully surrounded channel can have a rounded, circular, elliptical, square, rectangular, or polygonal cross section. In particular embodiments, a channel can be located in a flow cell, for example, being embedded within the flow cell. A channel in a flow cell can include one or more windows that are transparent to light in a particular region of the wavelength spectrum.

As used herein, the term "code" means a system of signals or symbols that represents or communicates information. Generally, the signals or symbols represent or communicate the information in accordance with a set of rules for translation. In particular embodiments, the set of rules provides translation into a human- or computer-readable language. The rules for translation can be used to create information content that is more complex than the content that would be sufficient to merely indicate the presence or absence of the signals or symbols.

As used herein, the term "digit," when used in reference to a code, means a type of signal or symbol used in the code. Combinations of the digits represent information in the code. It will be understood that a numerical digit such as an Arabic number is only one type of digit that is useful in a code. Although one or more numerical digits can be used in a code set forth herein, it will be understood that a code set forth herein need not use nor be limited to the use of numerical digits. Accordingly, a code can include numerical and/or non-numerical digits. A code can exclude numerical and/or non-numerical digits.

As used herein, the term "each," when used in reference to a collection of items, is intended to identify an individual item in the collection but does not necessarily refer to every item in the collection. Exceptions can occur if explicit disclosure or context clearly dictates otherwise.

As used herein, the term "etch" means to treat the surface of a material to remove at least a portion of the material from the surface. The removal can be carried out by chemical, thermal, optical or physical means, so long as the result is removal of material from the surface. Etching can remove, for example, at least 1 ng, 10 ng, 100 ng, 1 µg, 10 µg, 100 µg, or 1 mg or more material from the surface. Conversely, it will be understood that a treatment other than etching can be used to modify a surface without removing material from the surface. For example, a treatment may result in no more than 1 mg, 100 µg, 10 µg, 1 µg, 100 ng, 10 ng, 1 ng or less material is removed from the surface. Thus, a non-etching treatment can be used in a way that an insubstantial amount of material is removed from a surface, whether or not the material on the surface is modified in some way.

As used herein, the term "luminescence" means emission of cold body radiation by a material. The term is intended to be distinct from incandescence which is radiation emitted from a material as a result of heat. Generally luminescence results when an energy source displaces an electron of an atom out of its lowest energy ground state into a higher energy excited state; then the electron returns the energy in the form of radiation so it can fall back to its ground state. A particularly useful type of luminescence occurs when the energy is provided by excitation radiation and is called "fluorescence" or "photoluminescence". Fluorescence or photoluminescence can be perceived as emission of radiation by a material at a wavelength that is a result of irradiating the material at another wavelength. In accordance with the meaning of the terms "fluorescence" and "photoluminescence" in the art, they are not used herein to describe reflection, refraction, or scattering of radiation.

As used herein, the term "information" means knowledge or facts about a thing or event. The thing to which the knowledge or facts pertain can be a thing other than the thing that carries the information. For example, information about one thing can be carried in a code that is physically associated with a second thing. Similarly, the event to which the knowledge or facts pertain need not be an event that was experienced by a thing that carries the information. For example, information about an event can be written into a thing via an event that is separate and different from the event to which the knowledge or facts pertain.

As used herein, the term "manipulation," when used in reference to an item, means a physical change made to the location, orientation, physical state or composition of the item. Exemplary manipulations of an item can include, but need not be limited to, handling of the item, movement of the item, modification of the item, alteration of the item, use of the item, for example, in a chemical or biological assay, wetting of the item, irradiation of the item (e.g. during detection) or the like.

As used herein, the term "optical modification" means a change to a material that alters the physical reaction of the material to electromagnetic radiation. Exemplary physical reactions that can be changed include, but are not limited to, reduction, increase or shift in one or more of (a) the wavelength of maximum absorption for the material, (b) the wavelength of maximum excitation for the material, (c) the wavelength of maximum emission for the material, (d) the polarization of absorption, excitation or emission for the material and (e) the luminescence quantum yield (overall or at particular wavelengths). It will be understood that the creation or destruction of any of these physical reactions are also considered as optical modifications. In particular embodiments, the change to the material is a change to the chemical composition of the material. The electromagnetic radiation that interacts with the material can occur in a part of the spectrum such as the ultraviolet (UV), visible (VIS), red, orange, yellow, green, blue, violet, infrared (IR) or combinations thereof.

As used herein, the term "rigid," when used in reference to a material, means the material is stiff or inflexible. The rigid material can optionally be capable of taking up a liquid (e.g. due to porosity) but will typically not swell substantially when taking up the liquid and will not contract substantially when the liquid is removed by drying.

As used herein, the term "solid support" refers to a substrate that is insoluble in aqueous liquid. The substrate can be non-porous or porous. The solid support can be rigid or flexible. A nonporous solid support generally provides a seal against bulk flow of liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Particularly useful solid supports for some embodiments have at least one surface located within a flow cell.

As used herein, the term "spatial pattern" means an arrangement of features in or on a material. The features can occur in a regular, repeating arrangement or in an irregular, non-repeating arrangement. Exemplary patterns include, but are not limited to, a barcode (e.g. linear or matrix barcode), one or more alphanumeric character, one or more word, a grid of dots or other features (e.g. in a hexagonal grid, rectilinear grid or random grid) or one or more symbols. The features in a spatial pattern that are distinguished in a particular embodiment of the present disclosure can be separated by distances of at least about 100 nm, 500 nm, 1 µm, 10 µm, 100 µm, or 1 mm or more. Alternatively or additionally, the features in a spatial pattern that are distinguished in a particular embodiment of the present disclosure can be separated by no more than 1 mm, 100 µm, 10 µm, 1 µm, 500 nm, 100 nm or less.

As used herein, the term "transparent" means permitting the passage of radiation in a particular wavelength range of the electromagnetic spectrum. The wavelength range can be, for example, ultraviolet (UV), visible (VIS), red, orange, yellow, green, blue, violet, infrared (IR) or combinations thereof.

The embodiments set forth below and recited in the claims can be understood in view of the above definitions.

The present disclosure provides a method for tracking an item. The method can include the steps of (a) providing an item having a solid polymer material; (b) irradiating the item to create a spatial pattern of optical modifications in the polymer material, wherein the spatial pattern of optical modifications includes a code that indicates information; and (c) detecting the pattern of optical modifications, thereby determining the information.

The polymer used in a method or apparatus herein can be a polyimide material. A polyimide material is composed of imide monomers. Exemplary types of polyimides include aliphatic polyimides, aromatic polyimides, aromatic heterocyclic polyimides or semi aromatic polyimides. The polyimide can be solid, for example, after having been cured using known techniques such as heating or thermosetting. Polyimides having thermoplastic properties are useful in many embodiments. Particularly useful polyimides are aromatic polyimides such as those known by the commercial name Kapton® (DuPont, Wilmington, Del.) and having Chemical Abstracts Service Registry 25036-53-7. Kapton® is synthesized by polymerizing an aromatic dianhydride and an aromatic diamine. Kapton H is believed to be poly (4,4'-oxydiphenylene-pyromellitimide). Useful Kapton® products include Kapton® B (also known as Black) Kapton®, Kapton® CR, Kapton® FCR, Kapton® FN, Kapton® FPC, Kapton® HN, Kapton® HPP-ST, Kapton® MT, Kapton® PST, Kapton® FWN, Kapton® FWR, Kapton® GS, and Kapton® RS. Also useful is Kapton H which is believed to be poly (4,4'-oxydiphenylene-pyromellitimide). Another useful aromatic polyimide is APICAL® (Kaneka Corporation, Japan) Polyimide which is produced by the polycondensation reaction between an aromatic dianhydride and an aromatic diamine. Useful APICAL® products include, for example, APICAL® Type AF, APICAL® Type AV and APICAL® Type NP. UPILEX® (Ube Industries, Ltd., Japan) is another useful aromatic polyamine, and is the product of the polycondensation reaction between biphenyltetracarboxylic dianhydride (BPDA) and diamine. Exemplary commercial forms of this polyimide include UPILEX®-R and UPILEX®-S. Other commercially available polyimides that can be useful in a composition or method set forth herein include Kaptrex® (Professional Plastics, Fullerton, Calif.) products, such as Kaptrex® FN (BOPI polyimide coated with FEP resin), VTEC® PI (RBI, Inc., Reading Pa.), and Norton® Polyimides, for example in the commercially available TH Series: TH-012, TH-019, TH-025, TH-050, TH-075, TH-125 (Saint-Gobian, Worcester, Mass.).

In some embodiments, the polymer used in a method or apparatus herein can include amine moieties. Exemplary amine-containing polymers include, but are not limited to, those having polyimides, poly(amido amine), polyethyleneimine, poly(amino ester), or polyuria dendrimer moieties.

Alternatively or additionally, the polymer used in a method or apparatus herein can be a silicon-based polymer. Examples include, but are not limited to, polymers that include polymethylsilsesquioxane (e.g. Wacker-Besil® PMS MK) or poly(ureamethylvinyl) silazane (e.g. Kion Ceraset® PUVMS).

Another useful polymer is a cyclic olefin polymer or cyclic olefin copolymer. Examples include, but are not limited to those produced by chain copolymerization of cyclic monomers (such as 8,9,10-trinorborn-2-ene (norbornene) or 1,2,3,4,4a,5,8,8a-octahydro-1,4:5,8-dimethanonaphthalene (tetracyclododecene)) with ethene, or by ring-opening metathesis polymerization of various cyclic monomers followed by hydrogenation (e.g. ARTON, commercialized by Japan Synthetic Rubber, or Zeonex or Zeonor, commercialized by Zeon Chemical).

One or more of the polymers exemplified above can be adhered to a transparent material (e.g. glass) via a thin adhesive layer. The adhesive can be an epoxy or other known adhesive for the materials being used. Such bonding methods can be particularly useful for fabricating a flow cell.

A spatial pattern of optical modifications or other code can be written into a polymer material (such as a polyimide, silicon-based, or amine-containing material) by irradiating the material with electromagnetic radiation. Typically, the radiation impinges on the surface to create an irradiation area that correlates with the cross section of the radiation beam. For example, the radiation beam can form a point of light on the surface. Decreasing point sizes can be used to facilitate the writing of smaller and more closely spaced features. Of course optical masks can be used in some embodiments to create features that are smaller than the cross sectional dimensions of the radiation beam. In particular embodiments, the beam diameters can be on the order of at most 1 mm, 100 µm, 10 µm, 1 µm, 500 nm, 100 nm or less. Alternatively or additionally, the beam diameter can be at least 100 nm, 500 nm, 1 µm, 10 µm, 100 µm, or 1 mm or more.

Typically, the radiation source can be actuated or toggled to allow a pattern of differentially treated features to be written on the surface. For example, in some embodiments a portion of the surface can be irradiated to modify its luminescent properties (e.g. to make it luminescent where no luminescence was previously detectable). The irradiated portion will thus function as a luminescent feature. Continuing with the example, the radiation source can be toggled to the off state and moved with respect to the surface, thereby maintaining another portion of the surface as non-luminescent. Repeated toggling and movement of the radiation source can be used to create a pattern of optical modifications.

A spatial pattern of optical modifications can create a code having a 2-digit radix based on a luminescent digit and non-luminescent digit. The radix can be increased by adding digits based on the size or shape of the luminescent portion and/or non-luminescent portion on the surface. For example a linear bar code can have a multi-digit radix based on multiple widths for the luminescent portion and/or non-luminescent portion (e.g. a radix of 4 using a narrow and wide digit for each of the luminescent and non-luminescent portions, a radix of 6 using 3 different width digits for each of the luminescent and non-luminescent portions etc.). A matrix barcode can similarly be configured to have multiple digits based on an even greater variety of shapes.

Alternatively or additionally to writing digits that are based on the presence or absence of an optical property, such as luminescence, the digits in a spatial pattern of optical modifications can be written to produce a reduction, increase or shift of an optical property. Useful optical properties in this regard include, for example, (a) the wavelength of maximum absorption for the material, (b) the wavelength of maximum excitation for the material, (c) the wavelength of maximum emission for the material, (d) the polarization of absorption, excitation or emission for the material and (e) the luminescence quantum yield (overall or at particular wavelengths).

The different optical properties exemplified above can be imparted to the surface of a material, such as a polyimide, silicon-based, or amine-containing material, by altering the wavelength, power or duration of the radiation used to write the code. A laser or other radiation source can be adjusted using techniques known to those skilled in the art to alter the wavelength, power or duration of the radiation impinging at different portions on a surface to create a desired code. In particular embodiments, irradiating a solid polymer material can result in a bathochromic shift or, alternatively a hypsochromic shift in absorption, excitation or emission peaks. Thus, a portion of the material that has been irradiated under writing conditions can in some embodiments be distinguished from a portion that has not been so treated based on a difference in apparent color for optical absorption, luminescence excitation or luminescence emission.

When writing a code onto a polymer material (e.g. polyimide, silicon-based, or amine-containing material) the radiation can be delivered to the surface of the material using a coherent light source. Exemplary coherent light sources include, but are not limited to, lasers such as a gas laser (e.g. $CO_2$), solid-state laser, fiber laser, photonic crystal laser, semiconductor laser, dye laser, diode laser or free electron laser.

In particular embodiments, the radiation that is provided to the surface of a polymer, for writing a code will be at a power of at least 50, 100, 250, 500, 750 or 1,000 kWatts/cm$^2$ or more. Alternatively or additionally, the power can be at most 1,000, 750, 500, 250, 100 or 50 kWatts/cm$^2$ or less Irradiation at a particular spot or portion of the surface can last, for example, at least 1 msec, 10 msec, 100 msec, 1 sec or longer when writing a code in or on a polymer material. For example, the speed of a code reading device can be set so that a radiation spot travels at least 50, 100, 500, or 1000 mm/sec across a surface.

The spot diameter for radiation on a surface can be at least about 10, 25, 50, 100 or 1000 microns or more. Alternatively or additionally, the spot size can be at most 1000, 100, 50, 25 or 10 microns or less.

The repetition rate for a radiation source used to write a code can be, for example, at least 20, 100, 175 khz or more. Alternatively or additionally the repetition rate can be at most 175, 100 or 20 khz or less.

The wavelength of irradiation for writing features on the surface of a polymer material can be in the ultraviolet (UV), visible (VIS), red, orange, yellow, green, blue, violet, infrared (IR) region of the spectrum or in some combination of these ranges. UV radiation is particularly useful for writing codes in polyimide material. Other wavelengths can be used as well. Furthermore, codes can be written into other materials using wavelengths that are appropriately tuned to the materials. For example, many polymers are tuned to IR radiation such that IR radiation results in localized heating and creation of a fluorescent surface.

In particular embodiments, irradiation for writing a code in or on a polymer can be provided under conditions to induce localized heating at portions of the surface of a polymer material. Bulk heating to temperatures of at least 90° C., 175° C., 215° C. or 260° C. has been shown to alter luminescence properties of amine-containing polymers (see Jia et al., *Chem. Commun.* 50:11488-11491 (2014), which is incorporated herein by reference). Although not necessarily wishing to be limited by mechanism or theory, achieving these same temperatures at different portions of the surface of an amine-containing polymer using a radiation source as set forth herein may result in the writing of a code in or on that polymer. The power, duration and/or wavelength of the irradiation can be adjusted to yield a desired localized temperature to impart a desired digit into a code. For example, bulk heating of silicone-based polymers at temperatures in the range of about 200° C. to 400° C. has been shown to create material that is fluorescent in the UV range of the spectrum, whereas heating to temperatures at about 500° C. or higher has been shown to create material that is fluorescent in the blue or green region of the visible spectrum (see Menapace et al. *J. Meter. Sci.* 43:5790-5796 (2008), which is incorporated herein by reference). Again not necessarily wishing to be limited by mechanism or theory, achieving these same temperatures at different portions of the surface of a silcone-containing polymer using a radiation source as set forth herein may result in the writing of a code in or on that polymer.

In one example, a code can be written into the solid polyimide of an Illumina flow cell using the green (532 nm) or red (660 nm) laser of a HiSeq® instrument at a power setting of about 100 W/cm$^2$.

In another example, a linear barcode was written into the surface of a black Kapton® spacer on an Illumina HiSeq® flow cell using a coherent laser diode Avia 355, rated at 10 W, emitting in the UV at 354.7 nm, set to a scan speed or 1000 mm/sec, a repeat rate of 1000 KHz, a 50 micron spot diameter, and set to 1 W output. The resulting code was detected on a HiSeq® instrument and is shown in FIG. 1.

In particular embodiments, irradiation conditions are selected that do not etch the surface of the polymer material. Thus, a spatial pattern of optical modifications need not include digits that are based on morphological features or surface contours of a surface. Particular embodiments of the present methods, do not require the attachment of metals to the surface of a polymer or other solid material. Although metal patterns can provide information content to a code in some cases, a spatial pattern of optical modifications need not include metal for use in methods, compositions and apparatus set forth herein.

As set forth above, different digits in a code can be based on the presence or absence of an optical property (e.g. fluorescence) at one or more portions of the surface and optionally the digits can also be based on the shape of those portions. Alternatively or additionally, digits in a code can be based on different "colors" in fluorescence emission from different portions of the material, presence or absence of emission in response to exciting different portions of the material at a given excitation wavelength, different colors absorbed at different portions of the material, different polarization for excitation or emission at different portions of the material, or a combination of the foregoing properties (e.g. different emission colors detected for different excitation wavelengths).

In some cases different optical properties, such as those set forth above, can provide discrete digits of a code (e.g. a digital output based on apparent presence or absence of a particular optical property). The different optical properties can provide further digits to expand the radix of a code being used to track items. For example, a combination of 3 luminescence emission colors and 3 shapes can provide a radix of 9. The radix can be further expanded by adding a dimension of different polarization or different peak for luminescence excitation. Accordingly, a code used in a method or composition set forth herein can have a radix of at least 2, 3, 4, 5, 6, 7, 8, 9, 10 or more.

In particular embodiments, the optical properties of the pattern written into a material can provide greyscale digits (e.g. analog output based on scale of intensity or wavelength for a particular optical property). Intensity of luminescence emission can be understood in terms of quantum yield of luminescence. For example, one or more digits in a code can have luminescent quantum yield efficiencies of at least 0.05, 0.1, 0.2, 0.3, 0.4, 0.5, 0.6, 0.7, 0.8, 0.9 or higher. Alternatively or additionally, the luminescent quantum yield efficiencies for one or more digits can be less than 0.9, 0.8. 0.7, 0.6, 0.5, 0.4, 0.3, 0.2, 0.1, 0.05 or lower. The resulting changes in apparent luminescence signal from different portions of a material can provide the basis for greyscale digits.

For some codes, there may be a start digit and/or a stop digit. The start and stop digits may each take up more than one digit location if desired. In addition there may be an error check portion of the code, such as a check sum or CRC (cyclic redundancy check) having a predetermined number of digits, and a code section having a predetermined number of digits. The error check portion can function to ensure that the code which is obtained from an item is accurate. Accordingly, having a large number of digits in a code can allow for greater statistical accuracy in the code readout and can decrease the likelihood of providing an erroneous code. For example, an apparatus that reads a code can be configured or programmed with logic that establishes the following: if a code cannot be read without an error then no code will be recognized/acknowledged. Thus, an erroneous result can be avoided where there is doubt. Any of a variety of other known techniques for digital error checking for single or multi-digit errors may be used.

A code can be broken up into one or more groups of digits. For example, three digit groups can be present wherein the respective digit groups contain information about the item itself, a manipulation that the item has experiences and instructions for how the item is to be used. Information of any of a variety of types exemplified herein or otherwise known or determinable by those skilled in the art can be combined in this way.

A spatial pattern of optical modifications can be read using any of a variety of optical devices known in the art for detecting optical characteristics of a surface. Taking as an example a pattern that includes luminescent features, a fluorometer having excitation and emission optics can be used. High resolution flourometers, such as luminescent microscopes, can be useful for patterns having features (e.g. digits) that are resolvable on a microscopic scale. Depending upon the code being used and the dimensions of the digits in the code, the resolution of a detector can be configured to resolve features that are separated by at least about 1 nm, 10 nm, 100 nm, 1 µm, 10 µm, 100 µm, or 1 mm or more. Alternatively or additionally, the maximum feature separation resolvable by the detector may be 1 mm, 100 µm, 10 µm, 1 µm, 100 nm, 10 nm, 1 nm or lower.

An application-specific detection apparatus can be used, including, for example, a microarray imaging apparatus or a nucleic acid sequencing apparatus. Exemplary microarray imaging apparatus that can be use include, but are not limited to, the iScan® imager or HiScan® imager commercialized by Illumina, Inc. (San Diego, Calif.), GeneAtlas® system or GeneChip® scanner commercialized by Affymetrix (Santa Clara, Calif.) or SureScan® microarray scanner commercialized by Agilent (Santa Clara, Calif.). Exemplary nucleic acid sequencing apparatus that can be used include, but are not limited to, MiSeq®, NextSeq® and HiSeq® platforms commercialized by Illumina, Inc. (San Diego, Calif.) and SOLID™ sequencing platform commercialized by Life Technologies (Carlsbad, Calif.).

Typically, the conditions for reading an optical code will differ from the conditions used to write the code. An apparatus that is capable of irradiating the surface of a material with different power, wavelength or time duration can be particularly useful for embodiments that employ both writing and reading of codes on an item. For example, a particularly useful apparatus will have a radiation source that can be alternatively configured between a reading mode and a writing mode. A tunable laser or other tunable radiation source is particularly advantageous; however, it is also possible to equip an apparatus with two or more different radiation sources, at least one of which is a reading radiation source and the other of which is a writing radiation source. In many cases the reading radiation (i.e. radiation used to read a code) will be delivered at lower power to a material compared to the power and time duration for writing radiation (i.e. the radiation used to write a code). The total power delivered to a portion of a surface can be adjusted by changing intensity of the radiation impinging on the surface and/or the duration for the radiation to impinge on the surface. Alternatively or additionally, the reading radiation can be delivered at a wavelength that is shifted relative to the wavelength for the writing radiation. For example, the reading radiation can be bathochromically or hypsochromically shifted relative to the writing radiation.

When reading a code the radiation can be delivered to the surface of the material using a coherent light source. Exemplary coherent light sources include, but are not limited to, lasers such as a gas laser, solid-state laser, fiber laser, photonic crystal laser, semiconductor laser, dye laser or free electron laser.

In particular embodiments, radiation is provided to the surface of a polymer material (e.g. polyimide, silicon-based, or amine-containing material) for reading a code will be at a power of at least 200 mWatts, 500 mWatts, or 1 Watt or more. Alternatively or additionally, the power can be at most 1 Watt, 500 mWatts, 200 mWatts or less.

Irradiation of a spatial pattern of optical modifications on a surface can last, for example, at least 100 msec, 250 msec, 500 msec or 1 sec when reading a code. Alternatively or additionally, the duration of irradiation for reading the code can be at most 1 sec, 500 msec, 250 msec or 100 msec or less.

The wavelength of irradiation for reading a code on the surface of a polymer material can be in the ultraviolet (UV), visible (VIS), red, orange, yellow, green, blue, violet, infrared (IR) region of the spectrum or in some combination of these ranges. For embodiments that utilize luminescence detection, an emission signal that may result from the irradiation can be detected in the ultraviolet (UV), visible (VIS), red, orange, yellow, green, blue, violet, infrared (IR) region of the spectrum or in some combination of these ranges.

A code or information associated with the code may be used for many different purposes, such as for sorting items, tracking an item, identification of an item, verification of an item, authentication of an item, anti-theft/anti-counterfeit pertaining to an item, security/privacy pertaining to an item, forensics, or for other purposes. For example, in a commercial environment, a code may be used to track inventory for production information, or sales of goods/products. In a clinical or laboratory environment, a code can track patient identity, doctor identity, date that a sample was obtained or processed, quality of the sample, quality of results obtained from the sample, identity of procedures carried out on the sample, or the like. Generally, a code may provide a serial number, lot number, date or time of manufacture, date or time of use, identity of a process or reagents exposed to the item or have other information that identifies the item and/or information about the item.

In addition, a code lends itself to anti-counterfeit, anti-misuse and/or anti-theft type encoding, authentication, and identification techniques for items. For example, the code may contain an encrypted code that only the manufacturer or other entity can read and understand with the proper decryption. A code can be used to ensure single use of an item, for example, being written in or on an item after first use to communicate a prohibition on further use to an apparatus or user. Alternatively, a code can be used for quality assurance, for example, being written in or on an item after an observation of a failure in order to communicate a prohibition on further use to an apparatus or user or to communicate a warning regarding the quality of the item. Also, a code can be updated throughout the course of multiple uses for an item in order to track its history of use. An apparatus having both write and read capabilities is particularly useful in this regard.

Any of the codes described herein for labeling items may be used alone or in combination with other labeling, encoding, tracking, identification, authentication, or sorting technology, such as standard bar codes, RFID, alphanumeric labels or other technologies.

Several examples set forth herein have been described with respect to flow cells such as those used for nucleic acid sequencing. However, the concepts set forth in those examples can be applied to other items. Any of a variety of items having a polymer (e.g. polyimide, amine-containing polymer or silicone-based polymer) material can be used in a composition or method set forth herein. Examples include macroscopic or microscopic objects, commercial products, research tools, vessels for liquids or gases, laboratory equipment, storage containers, shipping containers, packaging, or any combination of or portion of one or more thereof. The items can be those that are normally used in applications pertaining to consumer markets, law enforcement, forensics, scientific research, diagnostics, medicine, collectibles, sporting goods, forestry, fashion, textiles, apparel, firearms, document storage or retrieval, shipping, storage, manufacturing or the like.

Another type of item that can include a polymer material having a code in accordance with the present disclosure, is an adhesive film, coating or tape. Accordingly, a roll of adhesive tape that may be easily attached to an item for labeling of other items is provided. The tape in the roll can have a code already written in or a code can be written into the tape after the tape has been adhered to another item.

Other items that can be used include cases (e.g., suitcases, briefcases, garment bags, and the like), cars, boats, paintings, china, jewelry, and the like. For example, a polymer material may provide a means of putting a vehicle identification number (VIN) or other similar identification information in a hidden location and/or in many locations on a vehicle that can be written into or read by the proper equipment. The polymer can be written to, for example, to track service records or to track change of ownership for the vehicle. The encoded polymer material may also be used to label currency, credit cards, access cards, key cards, ID cards, debit cards, and the like.

A polymer having a code as set forth herein may be used to label food containers, building materials (e.g., wood, pressboard, composite boards, drywall, wallboard, wallpaper, molding, tiles and the like or other building materials. Similarly, the codes may be used to label furniture or other home or office furnishings. Other items that can be labeled include documents, books, magazines and/or newspapers. Further items include clothing, garments, uniforms, linens, leather, footware, headgear, or textiles.

An encoded polymer may be used to label storage media, such as compact discs and digital video discs (DVD's), or any other devices that uses light to read information. Video or audio tapes, disc drives, flash drives and the like can also be used in a method or apparatus set forth herein.

Particularly useful items are vessels used in laboratory or clinical environments. Examples include, but are not limited to, flow cells (such as those used in sequencing apparatus), microarrays, multiwell plates, culture dishes, plates for growing protein crystals or other crystals, test tubes, flasks, strip tubes and the like. Such items can be made from a polymer set forth herein, can include a surface composed of such a polymer or can be attached to such a polymer (e.g. via adhesion, snap fit, bonding or the like).

A method for tracking an item can include steps of (a) providing an item comprising a solid polymer material; (b) carrying out a manipulation of the item; (c) irradiating the item to create a spatial pattern of optical modifications in the polymer material, wherein the spatial pattern of optical modifications comprises a code that indicates at least one characteristic of the manipulation; and (d) detecting the pattern of optical modifications, thereby determining the characteristic of the manipulation. Step (b) can be carried out before or after step (c). Accordingly, a code can be written into an item to indicate a characteristic of a manipulation that has occurred for the item or that will occur for the item. In some embodiments, a manipulation may be carried out on an item simultaneously with the writing of the code on the item.

Any of a variety of manipulations can be carried out on an item and recorded in a code, including for example, one or more steps in the manufacturing of the item, assessing quality of the item, using the item in an analytical process such as a diagnostic assay, transiently modifying the item, or permanently modifying the item. Other manipulations include those that are routinely carried out with the exemplary items and codes set forth herein. Examples include, but are not limited to, manipulations involved in commerce, such as marketing, sale, inventory or shipping of an item; manipulations involved in forensics, security or law enforcement, such as maintaining chain of custody, confirming identity, or testing for authenticity; and manipulations involved in research, medicine or diagnostics, such as quality assessment of samples, assay protocols carried out on samples, establishing chain of custody for samples, or communicating a result obtained for a sample.

Any characteristic that is relevant and useful to communicate about a manipulation can be indicated by a code. Exemplary characteristics include, but are not limited to, the fact that the manipulation occurred, the time when the manipulation occurred, the duration of the manipulation, a quality assessment of the manipulation, a number of times the manipulation is carried out or repeated, a location on the item where the manipulation occurred, or the identity of a modification of the item resulting from the manipulation. Again, any of a variety of characteristics that are normally associated with the items or manipulations set forth herein can be indicated by a code.

A method for tracking an item can include steps of (a) providing an item comprising a solid polymer material; (b) carrying out a manipulation of the item; (c) irradiating the item to create a spatial pattern of optical modifications in the polymer material, wherein the spatial pattern of optical modifications comprises a code that indicates at least one characteristic of the manipulation; (d) detecting the pattern of optical modifications, thereby determining the characteristic of the manipulation; and (e) selecting a second manipulation for the item based on the code that is determined. The second manipulation can be one or more of the manipulations exemplified above or elsewhere herein. In some embodiments, the second manipulation can be a repetition of the first manipulation.

Alternatively or additionally, a method for tracking an item can include steps of (a) providing an item comprising a solid polymer material; (b) carrying out a manipulation of the item; (c) irradiating the item to create a spatial pattern of optical modifications in the polymer material, wherein the spatial pattern of optical modifications comprises a code that indicates at least one characteristic of the manipulation; (d) detecting the pattern of optical modifications, thereby determining the characteristic of the manipulation; and (e) halting or pausing a process carried out on the item based on the code that is determined.

A method set forth herein can include a step of communicating information from to a code to a user or to a computer. Communication to a user can be via a user interface such as a screen, speaker, printer, mobile communications device (e.g. a smart phone or tablet), indicator lights or the like. Communication to a computer can occur via a hardwire connection or wireless transmission. The computer can be an integral part of an apparatus that writes a code on an item, reads a code on an item and/or manipulates an item having a code. Alternatively, the apparatus can be operably connected to a remotely located computer processing unit that is programmed to determine the code or information indicated by the code.

One or more of the steps that are carried out in a method set forth herein can be performed by an apparatus that includes a radiation source for writing an optical code and a detector for detecting the optical code. For example, an apparatus that carries out one or more steps can include an optical excitation source and an optical emission detector. The excitation source is optionally configurable to a first state for writing a code and to a second state for exciting the code in a luminescence detection mode. The optical emission detector can be a luminescence or fluorescence detector (e.g. a camera, Complementary metal-oxide-semiconductor (CMOS), charge coupled device (CCD), photomultiplier tube or photocell). The apparatus can be configured to automatically carry out one or more steps of a method set forth herein. Alternatively or additionally, one or more of the steps can be carried out by a user independently of the apparatus or by a user who is interacting with the apparatus.

In particular embodiments, an apparatus of the present disclosure can include a fluidic system that is configured to fluidically communicate with an item. As exemplified elsewhere herein, the apparatus can be a nucleic acid sequencing device and the item can be a flow cell that receives fluid reagents from the apparatus in accordance with one or more cycles of a sequencing protocol. In some embodiments, such as those using sequencing-by-synthesis as set forth below, the fluidic system can deliver reagents in repeated cycles. Repeated cycles of fluid delivery can also be useful for other applications where polymeric molecules are synthesized or sequenced, or for other applications. Alternatively, a fluidic system can be configured for non-cyclic delivery of reagents to a flow cell or other item. A microarray is an item that can be used advantageously in a method or apparatus of the present disclosure. Examples of apparatus and methods for fluidically processing microarrays are described in US Pat. App. Pub. No. US 2010/0009871 A1; US Pat. App. Pub. No. 2012/0270305 A1 and U.S. patent application Ser. No. 13/766,413, (published as US Pat. App. No. 2013/0260372 A1) each of which is incorporated herein by reference. These apparatus and methods can be modified to include the writing of codes and reading of codes as set forth herein. Other useful fluidic systems are those that move fluid droplets to and from detection areas via electrowetting or other techniques as described, for example, in U.S. patent application Ser. No. 13/670,318 (published as US Pat. App. Pub. No. 2013/0116128 A1), which is incorporated herein by reference. A cartridge used to move droplets can be modified to include polymers to which codes can be written and read. Furthermore, apparatus that move droplets in the cartridge can include optical systems for reading and writing the codes.

Other exemplary apparatus include those used to process or optically detect samples in a multiwell plate; a fluorescence microscope that optically detects samples on slides, plates or other items; or the like.

An apparatus of the present disclosure can further optionally include a computer processing unit that is programmed to alter fluidic communication with an item based on a code that is read from the item by the apparatus. Alternatively, the computer processing unit can be at a location that is remote from the apparatus, for example, configured to communicate via hardwire connection or wireless transmission.

Particular embodiments of the present disclosure pertain to nucleic acid sequencing methods and apparatus. Accordingly, the present disclosure provides a flow cell that includes (a) a transparent top window; (b) a transparent bottom window; (c) at least one channel between the transparent top window and the transparent bottom window; and (d) a spacer material between the transparent top window and the transparent bottom window, wherein a surface of the spacer material that faces the top window or the bottom window comprises a solid polymer material, wherein the solid polymer material comprises a spatial pattern of luminescent features that form a code carrying information indicating at least one manipulation carried out on the flow cell. The spacer material may be positioned to separate at least one channel from a second channel, wherein the spacer and channel are both located between the transparent top window and the transparent bottom window.

Exemplary flow cells and methods for their manufacture and use are described, for example, in WP 2014/142841 A1; U.S. Patent App. Pub. No. 2010/0111768 A1 and U.S. patent application Ser. No. 13/273,666, each of which is incorporated herein by reference. In particular embodiments a code is written into a region of the flow cell that is outside of a channel where fluids contact analytes and where analytical detection of the analytes occurs. For example, the code can be written to a surface on the face of the flow cell through which analytical detection occurs, whether that surface occurs on a spacer between wells, near an edge of the flow cell face, or near an inlet or outlet port. However, it is also possible to write a code on an edge of the flow cell that is orthogonal to the face through which analytical detection occurs.

Also provided is an apparatus that includes (i) a flow cell including (a) a transparent top window; (b) a transparent bottom window; (c) at least one channel between the transparent top window and the transparent bottom window; and (d) a spacer material between the transparent top window and the transparent bottom window, wherein a surface of the spacer material that faces the top window or the bottom window comprises a solid polymer material, wherein the solid polymer material comprises a spatial pattern of luminescent features that form a code carrying information indicating at least one manipulation carried out on the flow cell; (ii) a laser excitation source having a power output that is sufficient to modify the spatial pattern of luminescent features in the polymer material to change the code; (iii) a detector configured to resolve the spatial pattern of luminescent features; and (iv) a computer processing unit programmed to recognize the code and to identify at least one characteristic of the at least one manipulation based on the code.

A method of the present disclosure can include a step of performing one or more steps of an assay of biological materials in a flow cell, wherein a spatial pattern of optical modifications in or on the flow cell provides a code that indicates at least one characteristic of the one or more steps. For example, the assay can be a sequencing by synthesis protocol and fluid reagents for each step can be delivered to a flow cell. In SBS, extension of a nucleic acid primer along a nucleic acid template (e.g. a target nucleic acid or amplicon thereof) is monitored to determine the sequence of nucleotides in the template. The underlying chemical process can include polymerization (e.g. as catalyzed by a polymerase enzyme). In a particular polymerase-based SBS embodiment, fluorescently labeled nucleotides are added to a primer (thereby extending the primer) in a template dependent fashion such that detection of the order and type of nucleotides added to the primer can be used to determine the sequence of the template.

Optionally, the target nucleic acids can be present as clusters on the surface of a flow cell channel. Accordingly, a method of the present disclosure can include steps of attaching target nucleic acids to a flow cell surface and amplifying the attached target nucleic acids. Bridge amplification is a particularly useful method of solid phase amplification to create nucleic acid clusters. Examples of bridge amplification are described in Bentley et al., $Nature$ 456:53-59 (2008); U.S. Pat. No. 5,641,658 or 7,115,400; or in U.S. Pat. Pub. Nos. 2002/0055100 A1, 2004/0096853 A1, 2004/0002090 A1, 2007/0128624 A1, or 2008/0009420 A1, each of which is incorporated herein by reference in its entirety. Other amplification methods that can be carried out include, for example, polymerase chain reaction (PCR), rolling circle amplification (RCA), multiple displacement amplification (MDA) and other amplification methods set forth herein or known in the art. Examples of RCA are described in Lizardi et al., $Nat. Genet.$ 19:225-232 (1998) or US Pat. Pub. No. 2007/0099208 A1, each of which is incorporated herein by reference in its entirety. Also useful is MDA using a product of RCA (i.e. an RCA amplicon) as a template. Exemplary methods of MDA are described in U.S. Pat. Nos. 6,124,120; 5,871,921; or EP 0,868,530 B1, each of which is incorporated herein by reference in its entirety. Accordingly, amplification can be achieved in a method set forth herein by fluidic delivery of amplification reagents. One or more of the amplification steps can be tracked by writing and reading codes in or on the flow cell as set forth herein.

Flow cells provide a convenient format for housing an array of nucleic acid clusters that are subjected to an SBS technique that involves repeated delivery of reagents in cycles. Exemplary flow cells are set forth above and in references cited above. To initiate a first SBS cycle, one or more labeled nucleotides, DNA polymerase, etc., can be flowed into/through a flow cell that houses an array of nucleic acid clusters that have been hybridized to a sequencing primer. Those sites of an array where primer extension causes a labeled nucleotide to be incorporated can be detected. Optionally, the nucleotides can further include a reversible termination property that terminates further primer extension once a nucleotide has been added to a primer. For example, the labeled nucleotide that is contacted with the nucleic acid clusters can have a reversible terminator moiety that gets added to a primer such that subsequent extension cannot occur until a deblocking agent is delivered to remove the moiety. Thus, for embodiments that use reversible termination, a deblocking reagent can be delivered to the flow cell (before or after detection occurs). Washes can be carried out between the various delivery steps. The cycle can then be repeated n times to extend the primer by n nucleotides, thereby detecting a sequence of length n. Exemplary SBS procedures, fluidic systems and detection system components that can be readily adapted for use in a system of method of the present disclosure are described, for example, in Bentley et al., *Nature* 456:53-59 (2008), WO 04/018497; U.S. Pat. No. 7,057,026; WO 91/06678; WO 07/123744; U.S. Pat. Nos. 7,329,492; 7,211, 414; 7,315,019; 7,405,281, and US 2008/0108082, each of which is incorporated herein by reference.

Other sequencing procedures that use cyclic reactions can be used, such as pyrosequencing. Pyrosequencing detects the release of inorganic pyrophosphate (PPi) as particular nucleotides are incorporated into a nascent nucleic acid strand (Ronaghi, et al., *Analytical Biochemistry* 242(1), 84-9 (1996); Ronaghi, *Genome Res.* 11(1), 3-11 (2001); Ronaghi et al. *Science* 281(5375), 363 (1998); U.S. Pat. Nos. 6,210, 891; 6,258,568 and 6,274,320, each of which is incorporated herein by reference). In pyrosequencing, released PPi can be detected by being immediately converted to adenosine triphosphate (ATP) by ATP sulfurylase, and the level of ATP generated can be detected via luciferase-produced photons. Thus, the sequencing reaction can be monitored by detecting photons released during this chemiluminescent reaction. Accordingly, excitation radiation sources used for fluorescence based detection systems are not necessary for pyrosequencing procedures. However, such optics can be present in a pyrosequencing system for the purpose of writing and reading a code into a flow cell or other item used for the sequencing procedure. Useful fluidic systems, detectors and procedures that can be used for application of pyrosequencing to arrays of the present disclosure are described, for example, in WIPO Pat. App. Ser. No. PCT/US11/57111, US 2005/0191698 A1, U.S. Pat. Nos. 7,595,883, and 7,244,559, each of which is incorporated herein by reference.

Sequencing-by-ligation reactions are also useful including, for example, those described in Shendure et al. *Science* 309:1728-1732 (2005); U.S. Pat. Nos. 5,599,675; and 5,750, 341, each of which is incorporated herein by reference. Some embodiments can include sequencing-by-hybridization procedures as described, for example, in Bains et al., *Journal of Theoretical Biology* 135(3), 303-7 (1988); Drmanac et al., *Nature Biotechnology* 16, 54-58 (1998); Fodor et al., *Science* 251(4995), 767-773 (1995); and WO 1989/10977, each of which is incorporated herein by reference. In both sequencing-by-ligation and sequencing-by-hybridization procedures, target nucleic acids (or amplicons thereof) that are present at sites of an array are subjected to repeated cycles of oligonucleotide delivery and detection. Typically, the oligonucleotides are fluorescently labeled and can be detected using fluorescence detectors similar to those described with regard to SBS procedures herein or in references cited herein.

One or more of the steps used in a nucleic acid sequencing protocol set forth above can be tracked by writing and reading codes in or on the flow cell as set forth herein. The codes can indicate a characteristic of the sample being sequenced or of the sequencing protocol. Exemplary characteristics that can be encoded include, but are not limited to, the occurrence of one or more steps of a sequencing protocol, a number of the steps carried out in a cycle, a number of cycles carried out, the location on the flow cell where the one or more steps (or cycles) occurred, or a quality assessment of the one or more steps.

A decision can be made in a method (or an apparatus can be configured to make a decision) to carry out a further cycle of a sequencing by synthesis protocol based on the code that is determined. For example, a code indicating a desired quality level for previously performed cycles can prompt a decision to proceed with further cycles of sequencing. Alternatively, a decision can be made in a method (or an apparatus can be configured to make a decision) to halt or pause a sequencing by synthesis protocol based on the code that is determined. For example, a code indicating an undesirable level of quality for previously performed cycles can prompt a decision to discontinue further cycles of sequencing Identification of codes, determination of the information associated with the codes and instructing further action based on the codes as described herein, are typically performed using various computer executed algorithms and programs. Therefore, certain embodiments employ processes involving data stored in or transferred through one or more computer systems or other processing systems. Embodiments disclosed herein also relate to apparatus for performing these operations. Such apparatus may be specially constructed for the required purposes, or may include a general-purpose computer (or a group of computers) selectively activated or reconfigured by a computer program and/or data structure stored in the computer. In some embodiments, a group of processors performs some or all of the steps of a method set forth herein collaboratively (e.g., via a network or cloud computing) and/or in parallel. A processor or group of processors for performing the methods described herein may be of various types including microcontrollers and microprocessors such as programmable devices (e.g., CPLDs and FPGAs) and non-programmable devices such as gate array ASICs or general purpose microprocessors.

In addition, certain embodiments relate to tangible and/or non-transitory computer readable media or computer programs that include program instructions and/or data (including data structures) for performing various computer-implemented operations. Examples of computer-readable media include, but are not limited to, semiconductor memory devices, magnetic media such as disk drives, magnetic tape, optical media such as CDs, magneto-optical media, and hardware devices that are specially configured to store and perform program instructions, such as read-only memory devices (ROM) and random access memory (RAM). The computer readable media may be directly controlled by an end user or the media may be indirectly controlled by the end user. Examples of directly controlled media include the media located at a user facility and/or media that are not shared with other entities. Examples of indirectly controlled media include media that is indirectly accessible to the user via an external network and/or via a service providing shared resources such as the "cloud." Examples of program instructions include both machine code, such as produced by a compiler, and files containing higher level code that may be executed by the computer using an interpreter.

In various embodiments, the information or instructions employed in the disclosed methods and apparatus is provided in an electronic format. Such data or information may include codes, information associated with particular codes, instructions to be carried out based on particular codes or the information associated with the codes, and the like. As used herein, information or instructions provided in electronic format are available for storage on a machine and transmission between machines. Conventionally, information or instructions in electronic format is provided digitally and may be stored as bits and/or bytes in various data structures, lists, databases, etc. The information or instructions may be embodied electronically, optically, etc.

One embodiment provides a computer program for identifying a code, determining information associated with a code and/or instructing further action based on a codes or its associated information. The computer may contain instructions for performing any one or more of the above-described methods. As explained, the computer may include a non-transitory and/or tangible computer readable medium having a computer executable or compilable logic (e.g., instructions) recorded thereon for enabling a processor to identify a code, determine the information associated with a code and/or instruct further action based on a code. In one example, the computer comprises (1) a computer readable medium having a computer executable or compilable logic (e.g., instructions) stored thereon for enabling a processor to identify a code; (2) computer assisted logic for determining information associated with the code; and (3) an output procedure for communicating the information or for manipulating an item based on a code in or on the item.

In some embodiments, a method set forth herein is instructed by a computer-readable medium having stored thereon computer-readable instructions for carrying out a method for tracking or manipulating an item. Thus one embodiment provides a computer program comprising one or more computer-readable non-transitory storage media having stored thereon computer-executable instructions that, when executed by one or more processors of a computer system, cause the computer system to implement a method for tracking or manipulating an item. The method includes: (a) providing an item having a solid polymer material; (b) irradiating the item to create a spatial pattern of optical modifications in the polymer material, wherein the spatial pattern of optical modifications includes a code that indicates information; and (c) detecting the pattern of optical modifications, thereby determining the information. The method can optionally include a step of carrying out a manipulation of the item, wherein the spatial pattern of optical modifications comprises a code that indicates at least one characteristic of the manipulation.

In some embodiments, the instructions may further include automatically recording information pertinent to the item or a process that has been carried out on the item. For example, the item may be a flow cell (or other sample vessel) that is used in a nucleic acid sequencing process (or other fluidic assay). The information can be provided to the manufacturer of the item, a downstream user of the item or to an interested individual. Returning to the example of a flow cell that is used in a nucleic acid sequencing process, the results of the sequencing process can be recorded in a patient medical record for a human subject providing the sample that was sequenced. The patient medical record may be maintained by, for example, a laboratory, physician's office, a hospital, a health maintenance organization, an insurance company, or a personal medical record website. Further, based on the results of the processor-implemented process, the method may further involve prescribing, initiating, and/or altering treatment of a human subject from whom the sample was taken. This may involve performing one or more additional tests or analyses on additional samples taken from the subject.

Throughout this application various publications, patents and patent applications have been referenced. The disclosures of these publications in their entireties are hereby incorporated by reference in this application in order to more fully describe the state of the art to which this invention pertains.

The term "comprising" is intended herein to be open-ended, including not only the recited elements, but further encompassing any additional elements.

Although the invention has been described with reference to the examples provided above, it should be understood that various modifications can be made without departing from the invention. Accordingly, the invention is limited only by the claims.

What is claimed is:

1. A method for tracking an item, comprising:
   (a) providing an item comprising a solid polymer material;
   (b) irradiating the item to create a spatial pattern of optical modifications in the polymer material, wherein the spatial pattern of optical modifications comprises a code that indicates information; and
   (c) detecting the pattern of optical modifications, thereby determining the information; wherein the polymer material comprises (1) a polyimide material; or (2) a silicon-based polymer.

2. The method claim 1, further comprising a step of carrying out a manipulation of the item, wherein the spatial pattern of optical modifications comprises a code that indicates at least one characteristic of the manipulation.

3. The method of claim 1, wherein the information that is determined comprises the at least one characteristic of the manipulation,
   (1) wherein the manipulation is optionally selected from the group consisting of manufacturing the item, assessing quality of the item, using the item in a diagnostic assay, transiently modifying the item, and permanently modifying the item; or
   (2) wherein the at least one characteristic is optionally selected from the group consisting of the occurrence of the manipulation, the duration of the manipulation, a quality assessment of the manipulation, a number of times the manipulation is carried out or repeated, a location on the item where the manipulation occurred, and the identity of a modification of the item resulting from the manipulation.

4. The method of claim 1, wherein the optical modifications comprise increased absorption of light of one or more wavelengths, increased luminescence emission at one or more wavelengths, decreased absorption of light of one or more wavelengths, decreased luminescence emission at one or more wavelengths, a shift in wavelength of maximum light absorption, or a shift in wavelength of maximum luminescence emission, wherein the shift is optionally a bathochromic shift or a hypsochromic shift.

5. The method of claim 1, wherein the item is a flow cell.

6. The method of claim 5, further comprising a step of performing one or more steps of an assay of biological materials in the flow cell, wherein the spatial pattern of optical modifications comprises a code that indicates at least one characteristic of the one or more steps.

7. The method of claim 5, wherein the assay comprises a sequencing by synthesis protocol,
   optionally wherein the at least one characteristic is selected from the group consisting of occurrence of the one or more steps, a number of the steps carried out, a number of cycles carried out to repeat the one or more steps, the location on the flow cell where the one or more steps occurred, and a quality assessment of the one or more steps, and
   optionally further comprising selecting to carry out a further cycle of the sequencing by synthesis protocol based on the code that is determined.

8. The method of claim 1, wherein the spatial pattern comprises a linear barcode or matrix barcode, optionally wherein the spatial pattern comprises features that are separated by 100 microns or less.

9. A flow cell comprising
   (a) a transparent top window;
   (b) a transparent bottom window;
   (c) at least one channel between the transparent top window and the transparent bottom window; and
   (d) a spacer material between the transparent top window and the transparent bottom window, wherein a surface of the spacer material that faces the top window or the bottom window comprises a solid polymer material, wherein the solid polymer material comprises a spatial pattern of luminescent features that form a code carrying information indicating at least one manipulation carried out on the flow cell.

10. The flow cell of claim 9, wherein the polymer material comprises:
    (1) polyimide;
    (2) amine moieties; or
    (3) a silicon-based polymer.

11. The flow cell of claim 9, wherein the spatial pattern is substantially devoid of metal.

12. The flow cell of claim 9, wherein the spatial pattern comprises a linear barcode or matrix barcode.

13. The flow cell of claim 9, wherein the spatial pattern comprises features that are separated by 100 microns or less.

14. The flow cell of claim 9, wherein the spacer material separates the at least one channel from a second channel that is located between the transparent top window and the transparent bottom window.

15. An apparatus comprising
    (i) the flow cell of claim 9;
    (ii) a laser excitation source having a power output that is sufficient to modify the spatial pattern of luminescent features in the polymer material to change the code;
    (iii) a detector configured to resolve the spatial pattern of luminescent features; and
    (iv) a computer processing unit programmed to recognize the code and to identify at least one characteristic of the at least one manipulation based on the code.

16. The apparatus of claim 15, wherein the computer processing unit is programmed to identify a manipulation selected from the group consisting of manufacturing the item, assessing quality of the item, using the item in a diagnostic assay, transiently modifying the item, and permanently modifying the item.

17. The apparatus of claim 15, wherein the at least one characteristic is selected from the group consisting of the occurrence of the manipulation, the duration of the manipulation, a quality assessment of the manipulation, a number of times the manipulation is carried out or repeated, a location on the item where the manipulation occurred, and the identity of a modification of the item resulting from the manipulation.

18. The apparatus of claim 15, wherein the computer processing unit is further programmed to initiate, continue, pause or discontinue a sequencing by synthesis protocol carried out in the flow cell.

19. The apparatus of claim 18, wherein the at least one characteristic is selected from the group consisting of the occurrence of one or more cycles of the sequencing by synthesis protocol, the number of the cycles of the sequencing by synthesis protocol carried out, the location on the flow cell where one or more cycles of the sequencing by synthesis protocol occurred, and a quality assessment of one or more cycles of the sequencing by synthesis protocol.

20. The apparatus of claim 15, wherein the computer processing unit is further programmed to communicate information relating to the code to a user or to another computer processing unit.

21. The apparatus of claim 15, wherein the modification of the spatial pattern of luminescent features comprises increased absorption of light of one or more wavelengths, increased luminescence emission at one or more wavelengths, decreased absorption of light of one or more wavelengths, decreased luminescence emission at one or more wavelengths, a shift in wavelength of maximum light absorption, or a shift in wavelength of maximum luminescence emission, wherein the shift is optionally a bathochromic shift or a hypsochromic shift.

22. The apparatus of claim 15, wherein the power output of the laser comprises at least 1 Watt of laser power at 355 nm wavelength.

23. The apparatus of claim 15, wherein the detector is configured to resolve features that are separated by 100 microns or less.

* * * * *